United States Patent [19]

Ward et al.

[11] Patent Number: 5,221,503
[45] Date of Patent: Jun. 22, 1993

[54] METHOD FOR MANUFACTURING A DYNAMOELECTRIC DEVICE

[75] Inventors: Robert W. Ward; Sam B. Parker, both of Anderson, Ind.

[73] Assignee: General Motors Corporation, Detroit, Mich.

[21] Appl. No.: 837,124

[22] Filed: Feb. 19, 1992

Related U.S. Application Data

[63] Continuation-in-part of Ser. No. 783,466, Oct. 28, 1991, abandoned.

[51] Int. Cl.$^5$ .................. B29C 45/14; H22K 21/36
[52] U.S. Cl. .................. 264/104; 264/113; 264/126; 264/DIG. 58; 310/156
[58] Field of Search ....... 264/113, 126, 104, DIG. 58; 29/598; 310/156

[56] References Cited

U.S. PATENT DOCUMENTS

| | | | |
|---|---|---|---|
| 3,858,308 | 1/1975 | Peterson | 29/598 |
| 4,547,758 | 10/1985 | Shimizu et al. | 335/302 |
| 4,832,891 | 5/1989 | Kass | 264/101 |
| 4,845,837 | 7/1989 | Lloyd | 29/598 |
| 4,973,872 | 11/1990 | Dohogne | 310/156 |
| 5,004,577 | 4/1991 | Ward | 264/112 |
| 5,017,318 | 5/1991 | Vanderbilt | 264/113 |
| 5,032,335 | 7/1991 | Wilson | 264/113 |
| 5,043,123 | 8/1991 | Gormanns et al. | 264/113 |

OTHER PUBLICATIONS

Parent Application Ward et al., U.S. Ser. No. 07/783,466 filed Oct. 28, 1991.

Primary Examiner—Mary Lynn Theisen
Attorney, Agent, or Firm—Lawrence B. Plant

[57] ABSTRACT

A method of manufacturing an electromagnetic device having regions of ferromagnetic material and permanent magnet material is disclosed. The electromagnetic assemblies of this invention utilize thermoplastic encapsulated iron powders and epoxy resin encapsulated permanent magnet powder. A motor frame and permanent magnet assembly is formed in a first example, while a permanent rotor assembly is formed in a second. The motor frame and permanent magnet assembly has a ferromagnetic frame defined by a region of encapsulated iron powder and an annular array of permanent magnets defined by a region of encapsulated permanent magnet material. The permanent magnet rotor assembly has a ferromagnetic core defined by a region of encapsulated iron powder and a permanent magnet shell defined by a region of encapsulated permanent magnet material. In the processing of both the motor frame and permanent magnet assembly and the rotor assembly, annular inner and outer punch elements coaxial with a central core rod are supported within a heated die casing for independent extension and retraction along the central axis. The inner and outer punch elements are retracted to form cavities which are filled with the encapsulated permanent magnet and ferrous powders, respectively, for the motor frame and permanent magnet assembly, while the reverse exists for the manufacture of the permanent magnet rotor assembly. Coaxial pressing mechanisms individually and concurrently compress the powders to fuse and compact them to a predetermined axial length.

22 Claims, 6 Drawing Sheets

METHOD FOR MANUFACTURING A DYNAMOELECTRIC DEVICE

This patent application is a Continuation-In-Part of U.S. Ser. No. 07/783,466 filed Oct. 28, 1991, now abandoned.

The present invention generally relates to permanent magnet dynamoelectric devices, such as motors and generators, and particularly to the manufacture of components (e.g., rotors and frames) for such devices. More specifically, this invention relates to a method of manufacture which utilizes polymer encapsulated metal powder technologies.

BACKGROUND OF THE INVENTION

The use of polymer encapsulated powders to make various magnetic circuit elements is well known in the art For example, in U.S. Pat. No. 5,004,577 to Ward, assigned to the assignee of the present invention and issued on Apr. 2, 1991, polymer encapsulated iron powder is utilized in the manufacture of a motor frame. Polymer encapsulated powders have also been utilized in the manufacture of permanent magnets. As noted in the Ward patent, the encapsulant may be a thermoplastic material, and the parts may be formed by injection of preheated powder material or by compaction of powder material in a preheated die or mold.

It would be desirable to provide a simple method for production of rotors and frames for permanent magnet type dynamoelectric devices using these encapsulated magnetic powders, which method would be suitable to high volume production conditions. It would be further desirable if such a method enabled the production of various components of permanent magnet dynamoelectric devices, with a minimum of process steps and wherein the size and location of the ferromagnetic and permanent magnet regions within the devices could be easily varied.

SUMMARY OF THE INVENTION

It is therefore an object of this invention to provide a unique method for simply manufacturing components for permanent magnet dynamoelectric devices, from polymer encapsulated metal powders.

It is a further object of this invention that such a method be suitable for high volume production purposes.

It is yet a further object of this invention that such a method allow the location and size of the permanent magnet and ferromagnetic regions of the device to be readily varied.

It is still another object of this invention that such a method produce a dynamoelectric device having permanent magnetic regions which are formed integrally with ferromagnetic regions of the dynamoelectric device so as to form a unitary assembly.

In accordance with a preferred embodiment of this invention, these and other objects and advantages are accomplished as follows.

The present invention is directed to a method of manufacturing components of a permanent magnet dynamoelectric device, wherein two particular embodiments are (1) a motor frame and permanent magnet assembly, and (2) a permanent magnet rotor assembly, each of which utilize both iron and permanent magnet polymer encapsulated powders.

In the motor frame and permanent magnet assembly, the motor frame is ferromagnetic and defined by a region of encapsulated iron powder. One or more permanent magnets are disposed on an interior surface of the ferromagnetic motor frame and are defined by isolated regions of encapsulated permanent magnet material.

In the permanent magnet rotor assembly, a ferromagnetic core is defined by a region of encapsulated iron powder. A permanent magnet shell circumscribing the ferromagnetic core is defined by a region of encapsulated permanent magnet material.

The dynamoelectric components are individually manufactured by a multi-step process utilizing telescoping punches in a die. As an example, in the processing of the motor frame and permanent magnet assembly, a solid spacer, or core, rod is supported along a central axis of a heated die casing. Annular inner and outer punch elements coaxial with the core rod are supported concentrically within the die casing for independent extension and retraction along the central axis. The core rod may be a fixed element of the die casing. The inner punch element, which is supported on the core rod, forms one or more magnet cavities between the core rod and the outer punch element when retracted from the die casing. The outer punch element is supported on the inner punch element, and when retracted, forms a frame cavity between the inner punch element and the die casing.

The punch elements are initially extended into the die casing to expel any foreign matter. The inner punch element is then retracted to form the permanent magnet cavities, and a dispensing mechanism fills the permanent magnet cavities with a permanent magnet powder consisting of preferably permanent magnet particles encapsulated in a thermoplastic material. The outer punch is then retracted to form the frame cavity, and a dispensing mechanism fills the cavity with a composite ferrous powder. The composite ferrous powder is predominantly iron particles which are preferably encapsulated with a thermoplastic material.

The inner punch is then further retracted to axially center the ferromagnetic frame and permanent magnet cavities within the die casing. Thereafter, with the die casing at a suitable temperature, coaxial pressing mechanisms (e.g., the punches themselves) individually engage the permanent magnet and ferrous powders and concurrently compress the powders to fuse and compact the same to a uniform axial length. The inner and outer punch elements are then concurrently extended into the die casing to remove the compacted fused powders from the die casing. In the resulting structure, the compacted ferrous powder defines the motor frame and the compacted permanent magnet powder defines the magnetizable regions of the permanent magnet assembly.

The processing of the permanent magnet rotor assembly is notably similar to that of the motor frame assembly described above. The method utilizes a core rod and annular inner and outer punch elements which are similarly disposed within a heated die casing. However, in the processing of the rotor assembly, the inner punch element forms a core cavity between the core rod and the outer punch element when retracted from the die casing, while the outer punch element, when retracted, forms a magnet cavity between the inner punch element and the die casing. Accordingly, the outer punch element is retracted to form the magnet cavity to allow a dispensing mechanism to fill the magnet cavity with permanent magnet powder consisting of preferably permanent magnet particles encapsulated in a thermoplastic material. The inner punch element is then retracted to form the core cavity, and a dispensing mechanism fills the core cavity with the preferred composite ferrous powder. The core rod may be a fixed element of the die or, alternatively, may be removable for use as the rotor shaft.

The inner punch is then further retracted to axially center the ferromagnetic core and permanent magnet cavities within the heated die casing. Thereafter, coaxial pressing mechanisms which individually engage the permanent magnet and ferrous powders concurrently compress the powders to fuse and compact the same to a uniform axial length. The inner and outer punch elements are then concurrently extended into the die casing to remove the compacted fused powders from the die casing. In the resulting structure, the compacted ferrous powder defines the rotor core and the compacted permanent magnet powder defines the magnetizable regions of the rotor assembly.

Other objects and advantages of this invention will be better appreciated from the following detailed description.

BRIEF DESCRIPTION OF THE DRAWINGS

Reference will be made to the accompanying drawing wherein.

DETAILED DESCRIPTION OF THE INVENTION

Figure 1:
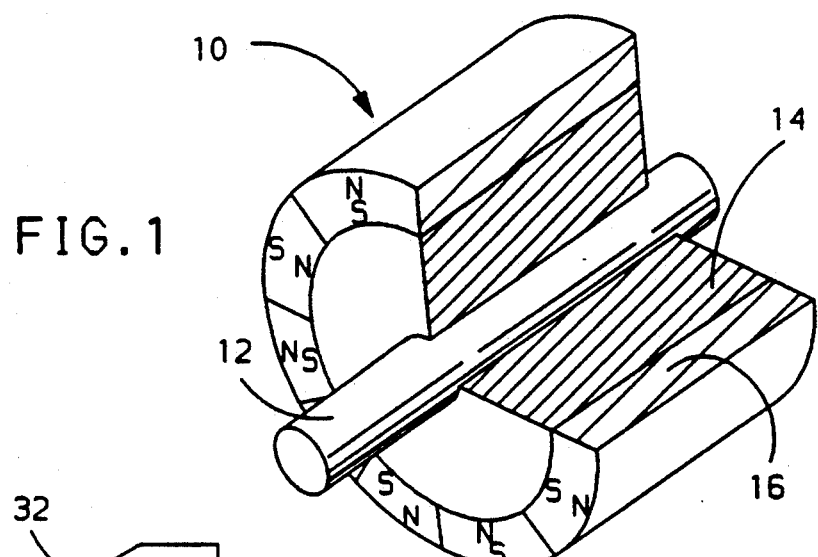
FIG. 1 is a sectioned perspective view of a permanent magnet rotor assembly manufactured according to this invention.

With reference to FIGS. 1 through 7, which correspond to the permanent magnet rotor assembly of the present invention, reference numeral 10 generally designates a permanent magnet rotor assembly comprising a central shaft 12, an inner ferromagnetic core 14, and an outer permanent magnet shell 16. According to this invention, the ferromagnetic core 14 is formed of a compacted ferrous powder, where the individual grains of the powder are preferably encapsulated with a suitable thermoplastic material such as a polyetherimide, polyamideimide or polyethersulfone. Other thermoplastic materials are well known in the art and will not be further discussed. The permanent magnet shell 16 is formed of compacted magnetizable powder in which the individual grains of such powder are also encapsulated. Preferably, the permanent magnet powder is encapsulated with a thermoplastic similar to that used with the iron particles, but could alternatively be encapsulated in a thermosetting resin such as an epoxy. If a thermosetting resin is used on the magnetizable powder and a thermoplastic used on the ferromagnetic powder, a separate curing step may be needed to harden the thermoset. In the course of manufacture, the thermoplastic materials fuse to form a unitary structure, the permanent magnet shell 16 being effectively bonded to the ferromagnetic core 14, and the ferromagnetic core 14 being firmly secured to the shaft 12. When a thermoset (e.g., epoxy) is used with the magnetizable powders, the encapsulant is cured separately from the thermoplastic on the iron particles (e.g., the epoxy is cured before the thermoplastic coated iron particles are introduced into the dies). Thereafter, the thermoplastic material is bonded to the epoxy during the final pressing operation. The rotor 10 may be formed with the shaft 12 in place or, alternatively, the shaft 12 may be press fit into a central opening formed in the ferromagnetic core 14.

Following compression and fusing of the encapsulated powders, the rotor assembly 10 is placed in a magnetizing fixture (not shown) and subjected to a strong magnetic field. The field aligns magnetic regimes within the magnetizable powder according to a predetermined pattern, forming permanent magnet poles in the shell 16, as shown in FIG. 1.

In the illustrated embodiment of the permanent magnet rotor assembly 10, the ferrous powder is predominantly iron, and the magnet powder is predominantly neodymium-iron-boron, marketed by General Motors Corporation under the trademark "MAGNEQUENCH". The thermoplastic material encapsulating the ferrous powder (and if desired the permanent magnet powder) is most preferably an amorphous polytherimide resin, an example of which is marketed by General Electric Corporation under the trademark "ULTEM". The preferred epoxy resin for encapsulating the permanent magnet powder is an appropriate thermosetting resin having a suitable curing agent. One such type of materials are disclosed in U.S. Pat. No. 4,558,077 to Gray, assigned to the same assignee of this patent application, and are polyglycidyl ethers of polyphenol alkanes characterized by high glass transition temperatures. Other suitable bonding agents could be employed for encapsulation of the ferrous and permanent magnet powders.

To encapsulate the powders, the thermoplastic material is mixed with a liquid solvent and then sprayed onto individual powdered particles. To facilitate this process, a source of heated air directs powder particles upward through a vertical tube (not shown) in which the spraying occurs. The coated particles fall outside the tube and thereafter are directed back to an inlet of the tube. After a umber of passes through the tube, the particles are all coated to a desired extent. In the course of this process, the solvent evaporates and may be recovered by known methods.

The manufacturing process of the rotor assembly 10 according to this invention is illustrated by FIGS. 2 through 7, which depict a punch and die mechanism 20 during sequential manufacturing stages. In the illustrated embodiment, the punch and die mechanism 20 includes a fixed central core rod 22 aligned along a longitudinal axis 24 of a heated die casing 30. An annular inner punch element 26 is slidably disposed about the core rod 22 while an annular outer punch element 28 slidably disposed between the inner punch element 26 and the heated die casing 30. A pair of powder dispensing mechanisms 32 and 34 are slidably disposed upon a die table 36 which is located at one end of the heated die casing 30 so as to be substantially perpendicular to the longitudinal axis 24. The powder dispensing mechanisms 32 and 34 are loaded with polymer encapsulated magnet and ferrous powder, respectively, and each are adapted to direct their respective powders into the cavities formed when the inner and outer punch elements 26 and 28 are retracted, as will be more fully explained below. Vibration of the die casing 30 or any of the other elements may be employed to enhance the powder filling steps of the present invention.

Figure 2:
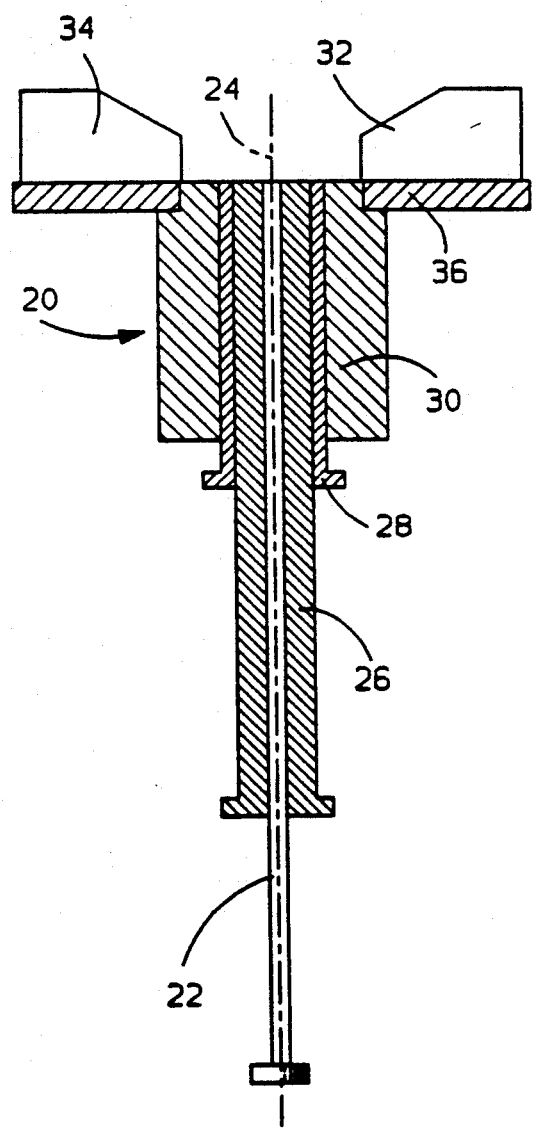
FIGS. 2 through 7 depict a first punch and die mechanism and a manufacturing sequence for purposes of forming the permanent magnet rotor assembly according to this invention.
Figure 3:
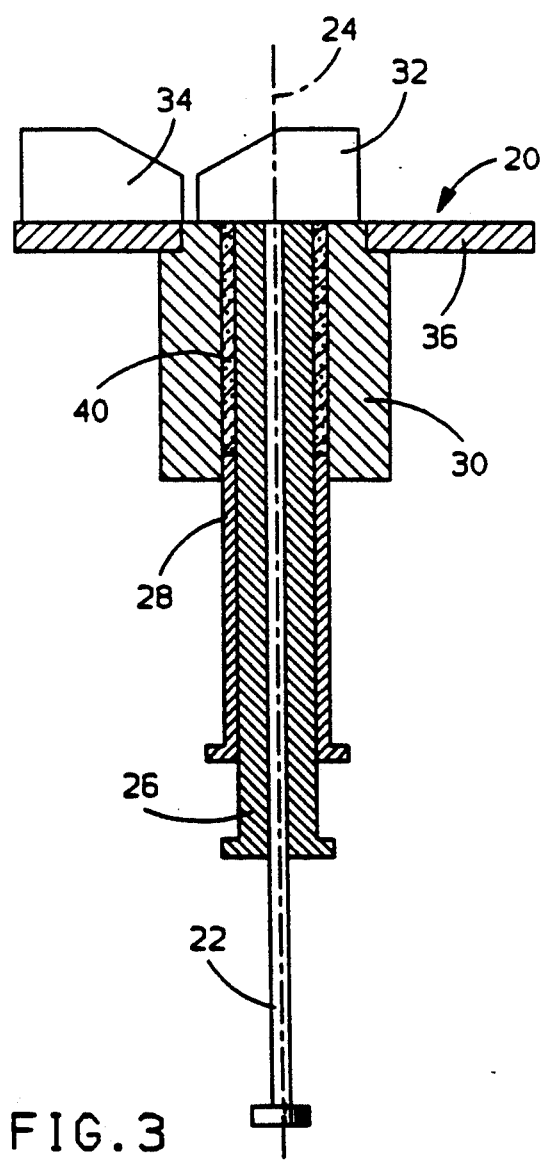

As shown in FIG. 2, the inner and outer punch elements 26 and 28 are initially extended to expel any foreign matter from the die casing 30. The outer punch element 28 is then retracted, as shown in FIG. 3, to form a permanent magnet cavity 40 between the heated die casing 30 and the outer diameter of the inner punch element 26. The dispensing mechanism 32 is the moved from its base position toward the longitudinal axis 24 of the punch and die mechanism 20, and thereafter fills the permanent magnet cavity 40 with encapsulated permanent magnet powder, as indicated in FIG. 3.

Figures 4, 5:
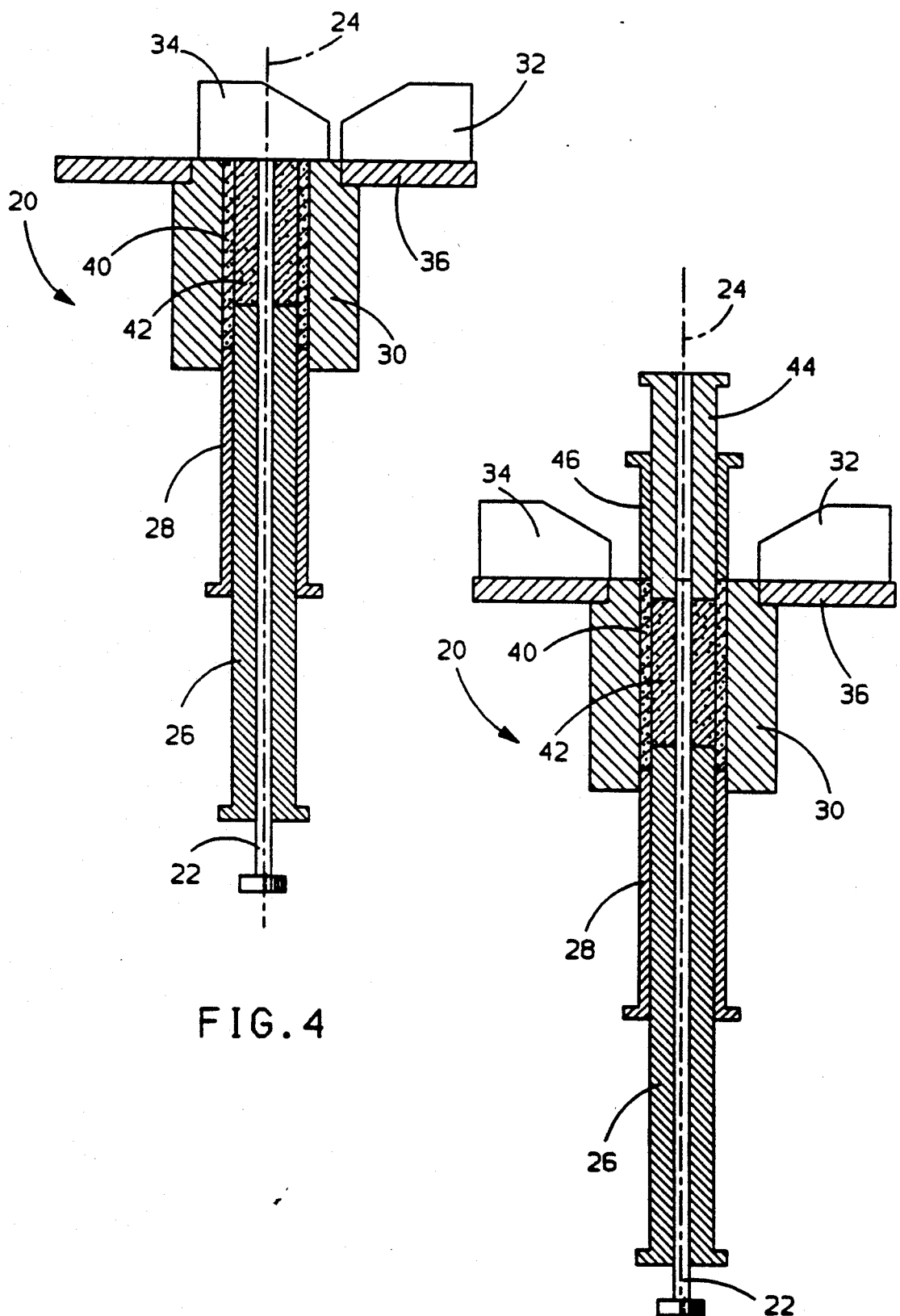

After the permanent magnet powder filling operation, the dispensing mechanism 32 is returned to its original position and the dispensing mechanism 34 is moved toward the longitudinal axis 24 of the die mechanism 20. The inner punch element 26 is then retracted, as seen in FIG. 4, to form a core cavity 42, which is immediately backfilled with encapsulated ferrous powder from the dispensing mechanism 34. The core cavity 42 is shorter than the permanent magnet cavity 40 due to differences in the apparent densities of the ferrous and permanent magnet powders.

After the ferrous powder filling operation, the dispensing mechanism 34 is returned to its base position, as seen in FIG. 5, and the inner punch element 26 is further retracted to axially center the core cavity 42 within the permanent magnet cavity 40. At the same time, a pair of upper punch elements 44 and 46 are positioned in axial opposition to the inner and outer punch elements 26 and 28, as indicated, in preparation for compaction of the ferrous and permanent magnet powders.

Figure 6:
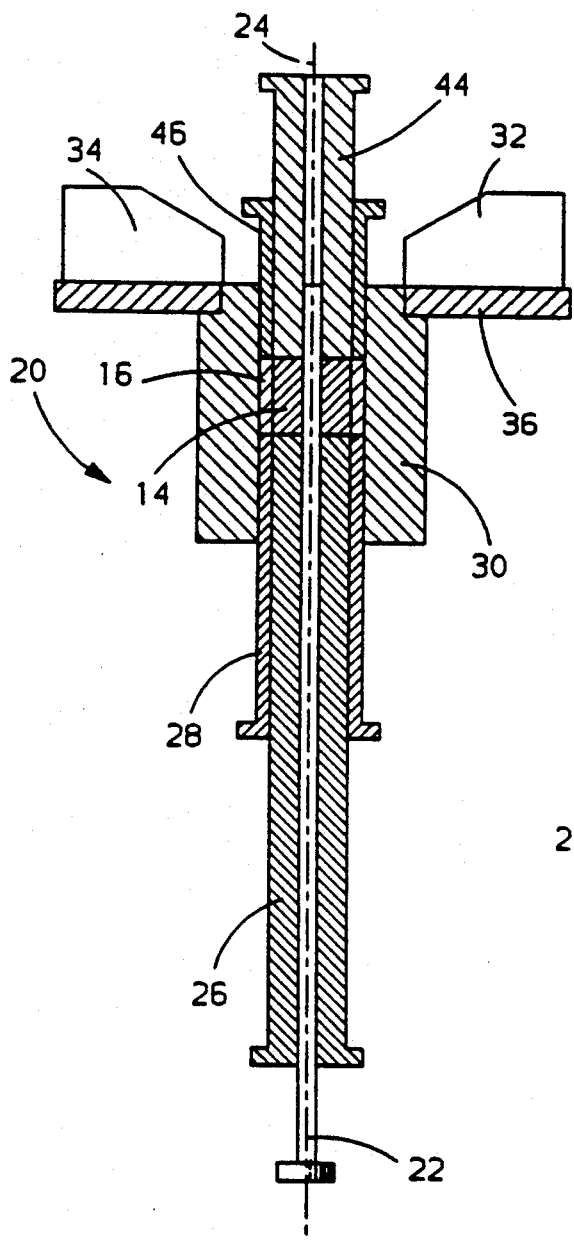

As depicted in FIG. 6, during the compaction step the oppositely disposed inner and outer punch elements 26, 44 and 28, 46 are concurrently forced toward each other, compressing each of the ferrous and permanent magnet powders to a desired height. As explained above, the ferrous and permanent magnet powders are initially filled to different levels to account for differences in the initial and final apparent powder densities.

Figure 7:
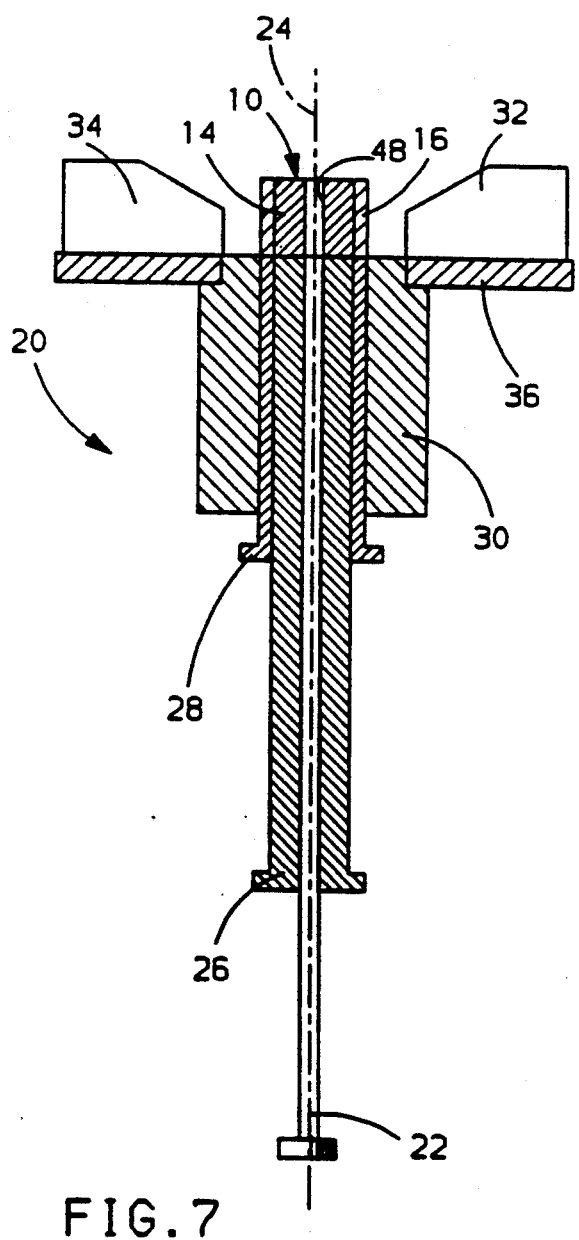
Figure 8:
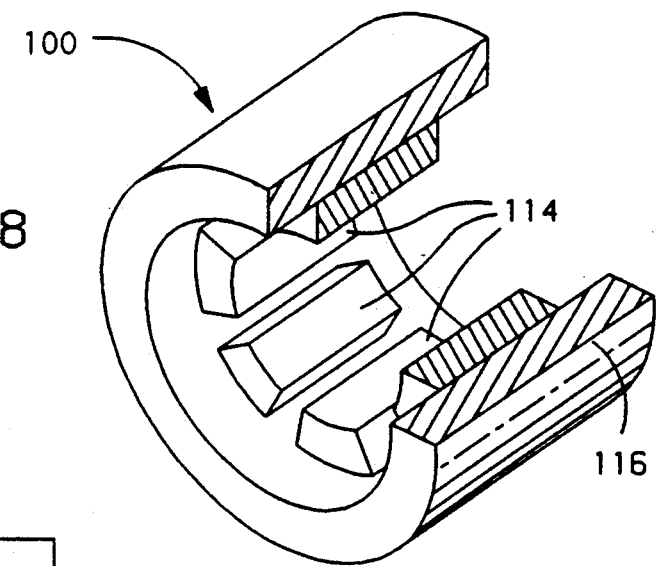
FIG. 8 is a sectioned perspective view of a motor frame and permanent magnet assembly manufactured according to this invention.

The compaction, in combination with the heating of the die casing 30, causes the thermoplastic material coating the particles to fuse. This forms a rigid bond within and between the ferromagnetic core and permanent magnet regions 14 and 16. As shown in FIG. 7, the upper punch elements 44 and 46 are retracted once the powders are compacted, and the inner and outer punch elements 26 and 28 are extended to their respective initial positions, as depicted in FIG. 2, to eject the rotor assembly 10 out of the punch and die mechanism 20. In the illustrated embodiment, and as seen in FIG. 7, the core rod 22 is fixed in the die mechanism 20, leaving a central opening 48 in the ferromagnetic core 14. In this case, manufacture of the rotor assembly 10 is completed with insertion of a shaft 12 through the opening 48, as mentioned above in reference to FIG. 1.

With reference now to FIGS. 8 through 14, reference numeral 100 generally designates a motor frame and permanent magnet assembly 100 including an outer ferromagnetic frame 116 and one or more inner permanent magnets 114. According to this invention, the motor frame 116 is formed of a compacted ferrous powder, where the individual grains of the powder are encapsulated with a suitable thermoplastic material. As noted above, such thermoplastic materials are well known in the art and will not be further discussed. Similar to the permanent magnet shell 14 of the permanent magnet rotor assembly 10 described above, the permanent magnets 114 are formed of a compacted magnetizable powder in which the individual grains of such powder are preferably encapsulated with a thermoplastic resin. In the course of manufacture, the thermoplastic materials fuse to form a unitary structure, the permanent magnets 114 being effectively bonded to the ferromagnetic frame 116. Alternatively, epoxy encapsulated magnetic particles may be used, and when so used are cured separately from the fusing of the thermoplastic encapsulant on the ferromagnetic particles. With a judicious choice of thermoplastic for the ferromagnetic powder and thermosetting resin for the magnetic particles, it may be possible to cure the thermoset and fuse the thermoplastic at the same time.

Following compression and fusing of the encapsulated powders, the motor frame and permanent magnet assembly 100 are placed in a magnetizing fixture (not shown) and subjected to a strong magnetic field to align magnetic regimes within the magnetizable powder, forming permanent magnet poles.

Similar to the permanent magnet rotor assembly 10 described previously, for purposes of the motor frame and permanent magnet assembly 100, the ferrous powder is predominantly iron while the permanent magnet powder is preferably the previously described "MAGNEQUENCH" composition marketed by General Motors Corporation. Similarly, the thermoplastic material encapsulating the ferrous and permanent magnet powders is preferably the amorphous polytherimide resin marketed by General Electric Corporation under the trademark "ULTEM". If a thermosetting resin is used to encapsulate the permanent magnet powders, a preferred epoxy resin is a suitable thermosetting resin with appropriate curing agent such as the materials disclosed in U.S. Pat. No. 4,558,077 to Gray. The encapsulation process for the powders is identical to that described above in reference to the permanent magnet rotor assembly 10.

The manufacturing process of the motor frame and permanent magnet assembly 100 according to this invention is illustrated by FIGS. 9 through 14, which depict a punch and die mechanism 120 during sequential manufacturing stages. The punch and die mechanism 120 is essentially identical to the punch and die mechanism 20 previously described for the manufacture of the permanent magnet rotor assembly 10, and includes a fixed central core rod 122 aligned along a longitudinal axis 124 of a heated die casing 130, inner and outer punch elements 126 and 128 slidably disposed between the core rod 122 and the heated die casing 130, and a pair of powder dispensing mechanisms 132 and 134 which are slidably disposed upon a die table 136 located at one end of the heated die casing 130. The upper end of the punch element 126 includes a plurality of circumferentially spaced fingers 139 defining therebetween mold cavities 140 for receiving and shaping the magnets. Further discussion of the punch and die mechanism 120 will be omitted here because of the previous relevant discussion pertaining to the permanent magnet rotor assembly 10.

Figure 9:
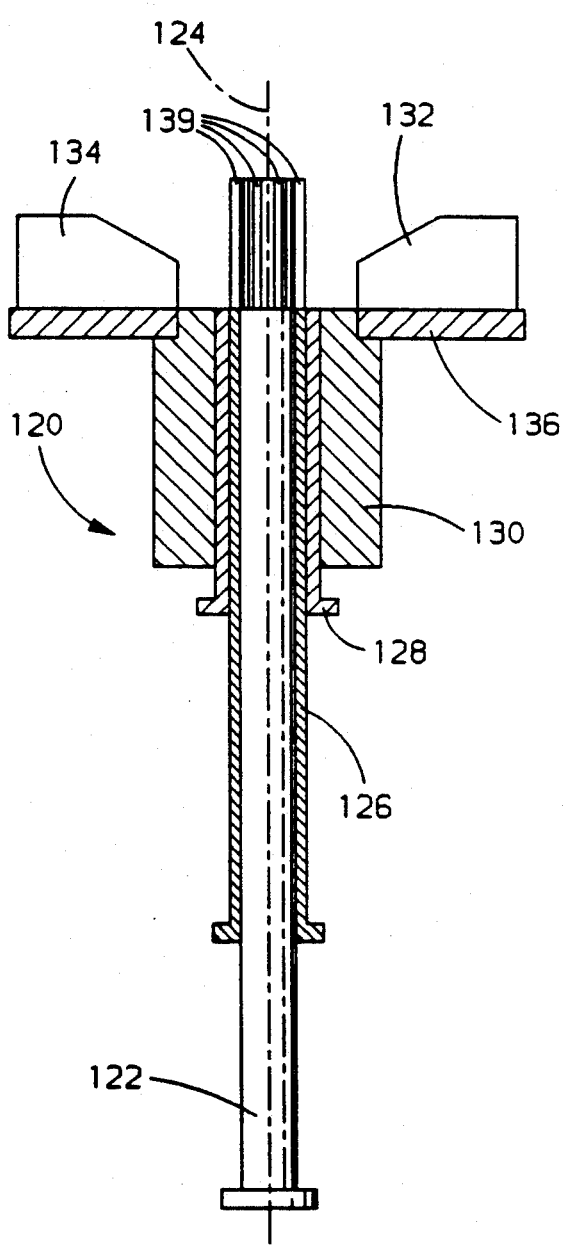
FIGS. 9 through 14 depict a second punch and die mechanism and a manufacturing sequence for purposes of forming the motor frame and permanent magnet assembly according to this invention.
Figure 10:
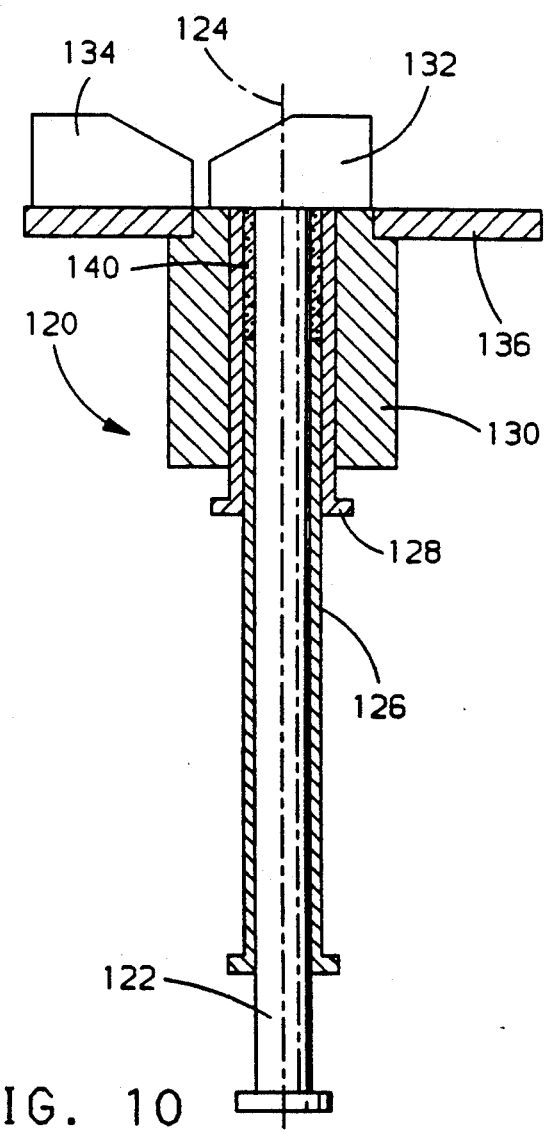

As shown in FIG. 9, the inner and outer punch elements 126 and 128 are initially extended to expel any foreign matter from the die casing 130. The inner punch element 126 is then retracted, as shown in FIG. 10, to form an annular array of permanent magnet cavities 140 between the inner diameter of the outer punch element 128 and the outer diameter of the central core rod 122. The dispensing mechanism 132 is then moved from its base position toward the longitudinal axis 124 of the punch and die mechanism 120, and thereafter fills the permanent magnet cavities 140 with encapsulated permanent magnet powder, as indicated in FIG. 10.

Figures 11, 12:
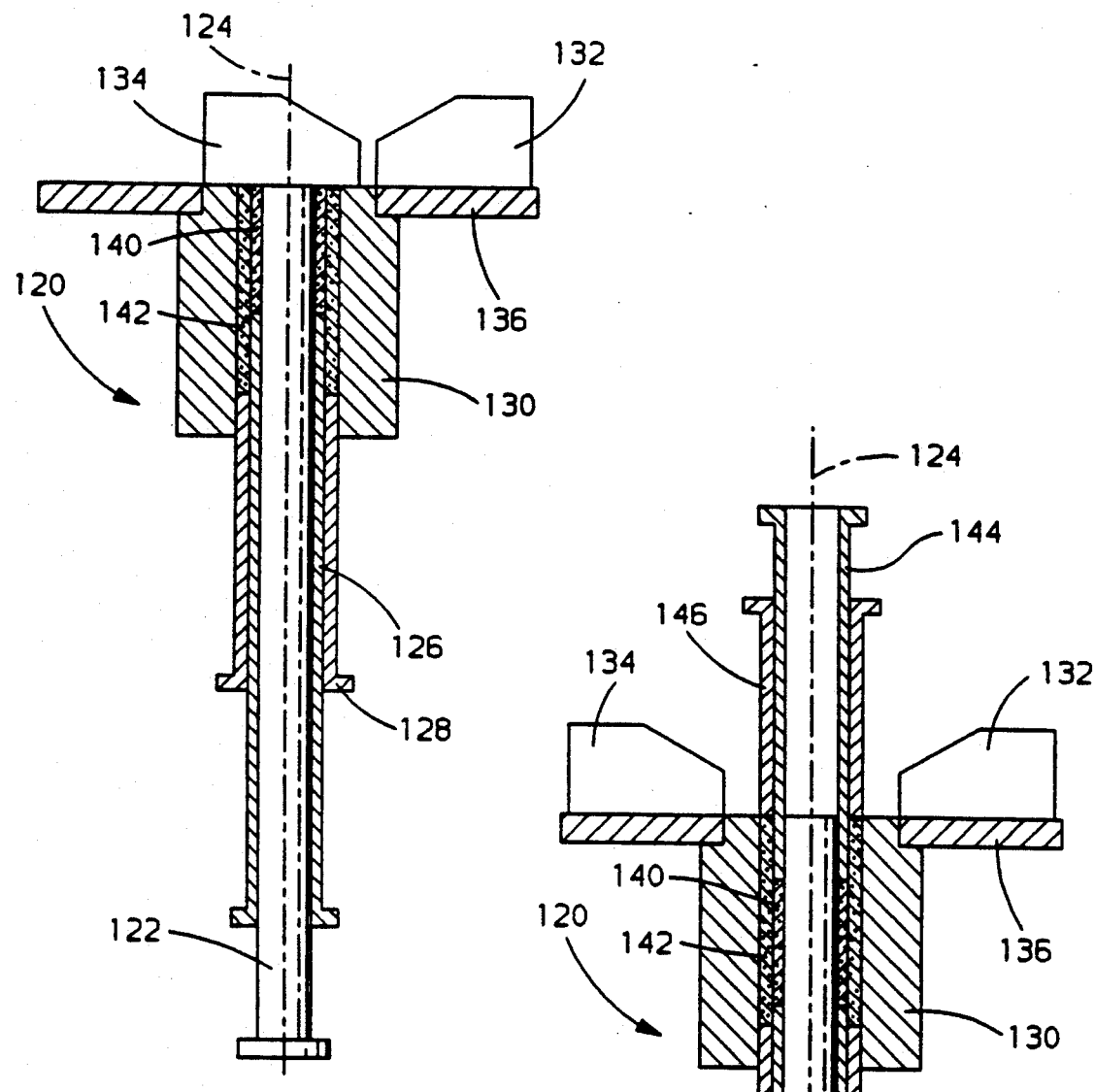

After the permanent magnet powder filling operation, the dispensing mechanism 132 is returned to its original position and the dispensing mechanism 134 is moved toward the longitudinal axis 124 of the die mechanism 120. The outer punch element 128 is then retracted, as seen in FIG. 11, to form cavity 142 which is immediately backfilled with encapsulated ferrous powder from the dispensing mechanism 134. The lengths of the permanent magnet cavities 140 and frame cavity 142 are predetermined to compensate for differences in the apparent densities of the ferrous and permanent magnet powders.

After the ferrous powder filling operation, the dispensing mechanism 134 is returned to its base position, as seen in FIG. 12, and the inner punch element 126 is further retracted to axially center the annular array of permanent magnet cavities 140 within the frame cavity 142. At the same time, a pair of upper counter punch elements 144 and 146 having end shapes complimentary to their opposed punches 136 and 128 respectively are positioned in axial opposition to the inner and outer punch elements 126 and 128, as indicated, in preparation for compaction of the ferrous and permanent magnet powders.

Figure 13:
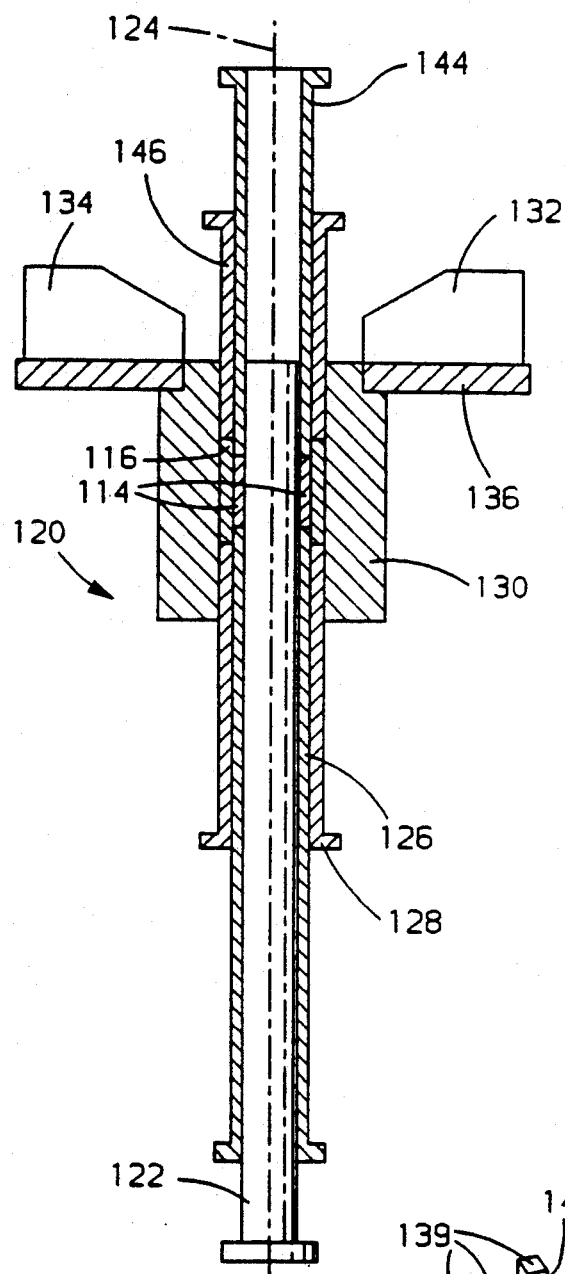

As depicted in FIG. 13, during the compaction step the oppositely disposed inner and outer punch elements 126, 144 and 128, 146 are concurrently forced toward each other, compressing each of the ferrous and permanent magnet powders to the predetermined desired heights as explained above. The compaction, in combination with the heating of the die casing 130, causes the thermoplastic materials, which coat the powder particles, to fuse, forming a rigid bond within and between the permanent magnet regions and ferromagnetic frame 114 and 116, respectively.

Figure 14:
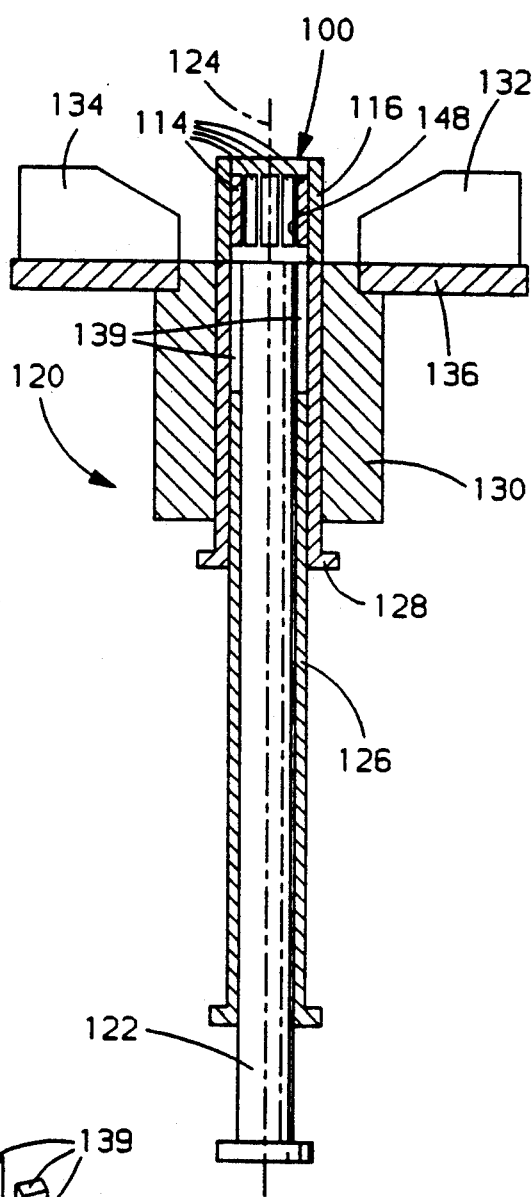
Figure 15:
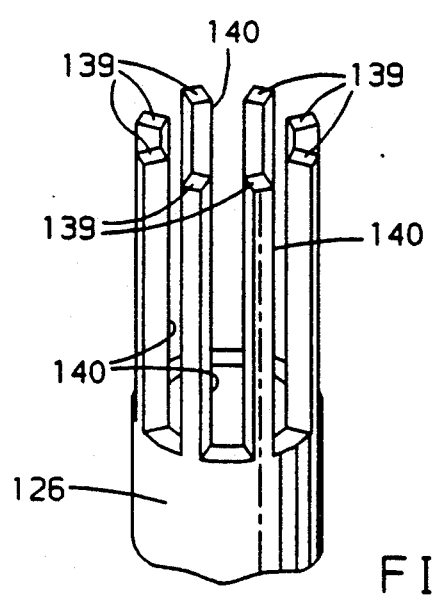
FIG. 15 is a perspective view of punch 126.

As shown in FIG. 14, the upper counter punch elements 144 and 146 are retracted once the powders are compacted, and the inner and outer punch elements 126 and 128 are extended to their respective initial positions, as shown in FIG. 9, to eject the motor frame and permanent magnet assembly 100 out of the punch and die mechanism 120. In the illustrated embodiment, and as seen in FIG. 14, the core rod 122 is fixed in the die mechanism 120, leaving a central opening 148 in the frame 114.

A particularly advantageous feature of this invention is that dynamoelectric devices having both ferromagnetic and permanent magnet regions can be readily manufactured, even under high volume production conditions, such as found in the auto industry. Moreover, the permanent magnets are formed as integral regions of the dynamoelectric device so as to form a unitary dynamoelectric device.

Another advantage provided by the present invention is that the method allows for the location and size of the permanent magnet and ferromagnetic regions to be varied relative to the dynamoelectric device, facilitating alterations to the design of the dynamoelectric device without undue processing modifications.

Therefore, while this invention has been described in terms of a preferred embodiment, it is apparent that other forms could be adopted by one skilled in the art, such as using alternative thermoplastic materials, or thermoset materials to encapsulate one or both powders. Moreover, alternative permanent magnet and ferromagnetic materials may be employed while still achieving the objects of the invention. Accordingly, the scope of this invention is to be limited only by the following claims.

The embodiments of the invention in which an exclusive property or privilege is claimed are defined as follows:

1. A method of manufacturing a component of a dynamoelectric device having regions of dissimilar magnetic properties formed from encapsulated powders, said method comprising the steps of:

forming a first cavity having a predetermined inner periphery and an outer periphery corresponding to a predetermined outer periphery of said electromagnetic device;

filling said first cavity with a first powder having predetermined magnetic properties, individual particles of said first powder being encapsulated with a first bonding agent;

forming a second cavity within said first cavity, said second cavity having an outer periphery defined by said inner periphery of said first cavity;

filling said second cavity with a second powder having dissimilar magnetic properties relative to said first powder, individual particles of said second powder being encapsulated with a second bonding agent; and heating and compacting said first and second powders to fuse and compact said first and second powders, thereby forming a unitary structure having a core surrounded by an integral shell, said core and shell having dissimilar magnetic properties.

2. A method of manufacturing a permanent magnet rotor assembly from encapsulated powders, comprising the steps of:

forming a first annular cavity about an axis, said first annular cavity having a predetermined inside diameter and an outside diameter corresponding to a predetermined outside diameter of said rotor assembly;

filling said first annular cavity with a magnetizable powder, individual particles of said magnetizable powder being encapsulated with a first bonding agent;

forming a second annular cavity radially within said first annular cavity, said second annular cavity having an outside diameter defined by said inside diameter of said first annular cavity;

filling said second annular cavity with a ferrous powder, individual particles of said ferrous powder being encapsulated with a second bonding agent; and heating said ferrous and magnetizable powders while compacting said ferrous and magnetizable powders in the direction of said axis to fuse and compact said ferrous and magnetizable powders, thereby forming a unitary rotor structure having a ferrous core surrounded by an integral magnetizable shell.

3. The method of manufacture set forth in claim 2, including the step of:
inserting a central shaft within said second annular cavity in substantial alignment with said axis, so as to define an axial opening in said ferrous core.

4. The method of manufacture set forth in claim 3, wherein the step of heating and compacting includes securing said central shaft to said ferrous powder so as to form a shaft for said unitary rotor structure.

5. The method of manufacture set forth in claim 1, wherein said ferrous powder is more compressible than said magnetizable powder, and the step of compacting said powders includes the steps of:
displacing the magnetizable powder to substantially center said second annular cavity within said first annular cavity along said axis; and
individually and concurrently compacting said magnetizable and ferrous powders from each end of said first and second cavities, respectively.

6. The method of manufacture set forth in claim 2, wherein said first bonding agent is an epoxy resin.

7. The method of manufacture set forth in claim 2, wherein said second bonding agent is a thermoplastic material.

8. The method of manufacture set forth in claim 2, wherein said first and second bonding agents are thermoplastic materials.

9. A method of manufacturing a permanent magnet rotor within a heated die casing, comprising the steps of:
forming a first annular cavity about an axis, said first annular cavity being defined by a first region between said heated die casing and an outer diameter of an axially retractable punch element disposed about said axis;
filling said first annular cavity with magnetizable powder, individual particles of said magnetizable powder being encapsulated with a first bonding agent;
retracting said punch element to form a second annular cavity defined by a second region between said first annular cavity and a core rod disposed substantially along said axis;
filling said second annular cavity with ferrous powder, individual particles of said ferrous powder being encapsulated with a second bonding agent; and
bi-directionally compacting said ferrous and magnetizable powders along said axis to bond and compact said ferrous and magnetizable powders together, thereby forming a unitary rotor structure having a ferromagnetic core defined by said ferrous powder and a magnetizable outer shell defined by said magnetizable powder.

10. The method of manufacture set forth in claim 9, wherein the step of bi-directional compacting includes bonding said core rod with said ferrous powder so as to form an integral shaft for said unitary rotor structure.

11. The method of manufacture set forth in claim 9, wherein said ferrous powder is more compressible than said magnetizable powder, and wherein the method includes the steps of:
retracting the punch element after the step of filling said first annular cavity to substantially center said second annular cavity within said first annular cavity along said axis; and
individually and concurrently compacting said magnetizable and ferrous powders from each end of said first and second cavities, respectively.

12. A method of manufacturing a motor frame and permanent magnet assembly from encapsulated powders, said method comprising the steps of:
forming an annular cavity along an axis, said first annular cavity having a predetermined inside diameter and an outside diameter corresponding to a predetermined outside diameter of a motor frame;
filling said first annular cavity with a ferrous powder, individual particles of said ferrous powder being encapsulated by a first bonding agent;
forming a second cavity radially within said annular cavity, said second cavity having an outside diameter which coincides with an inside diameter of said annular cavity;
filling said second cavity with a magnetizable powder, individual particles of said magnetizable powder being encapsulated with a second bonding agent; and
heating said ferrous and magnetizable powders while compacting said ferrous and magnetizable powders in the direction of said axis to fuse and compact said ferrous and magnetizable powders, thereby forming a unitary motor frame and permanent magnet structure, said permanent magnet being surrounded by said motor frame.

13. The method of manufacture set forth in claim 12, including the step of:
inserting a central shaft within said second cavity in substantial alignment with said axis so as to define an axial opening in said permanent magnet.

14. The method of manufacture set forth in claim 12, wherein said ferrous powder is more compressible than said magnetizable powder, and wherein the step of compacting said ferrous and magnetizable powders includes the steps of:
displacing the magnetizable powder to substantially center said second cavity within said annular cavity along said axis; and
individually and concurrently compacting said magnetizable and ferrous powders from opposing ends of said annular and second cavities, respectively.

15. The method of manufacture set forth in claim 12, wherein said first bonding agent is a thermoplastic material.

16. The method of manufacture set forth in claim 12, wherein said second bonding agent is an epoxy resin.

17. The method of manufacture set forth in claim 12, wherein said first and second bonding agents are thermoplastic materials.

18. A method of manufacturing a motor frame and permanent magnet assembly within a die casing, comprising the steps of:
forming an annular cavity about a longitudinal axis of said heated die casing, said annular cavity having an outer diameter defined by said die casing and an inner diameter defined by an outer diameter of an axially retractable punch element disposed along said longitudinal axis;
filling said annular cavity with a ferrous powder, individual particles of said ferrous powder being encapsulated with a thermoplastic material;
retracting said punch element to form an annular array of cavities, each of said cavities having a radially outward periphery being defined by said annular cavity and a radially inward periphery defined by a core rod disposed substantially along said longitudinal axis;

filling each of said cavities with a magnetizable powder, individual particles of said magnetizable powder being encapsulated with a thermosetting resin; and bi-directionally compacting both said ferrous and magnetizable powders along said longitudinal axis to bond and compact said ferrous and magnetizable powders, thereby forming a unitary motor frame and permanent magnet structure having an annular array of permanent magnets disposed within a motor frame.

19. The method of manufacture set forth in claim 18, further comprising the step of defining an axial opening within said annular array of permanent magnets by removing said core rod from said unitary motor frame and permanent magnet structure.

20. The method of manufacture set forth in claim 18, wherein said ferrous powder is more compressible than said magnetizable powder, and wherein the method includes the steps of:

retracting said punch element after said filling of said annular cavity with said ferrous powder so as to substantially center said annular array of cavities within said annular cavity along said longitudinal axis; and individually and concurrently compacting said magnetizable and ferrous powders from opposing ends of said annular cavity and said annular array of cavities, respectively.

21. The method according to claim 8 wherein said first and second thermoplastic bonding agents are essentially the same material.

22. The method according to claim 17 wherein said first and second thermoplastic bonding agents are essentially the same material.

* * * * *